(12) United States Patent
Jung et al.

(10) Patent No.: US 10,474,845 B2
(45) Date of Patent: Nov. 12, 2019

(54) DUO OPERATING SYSTEM FOR ANDROID SECURITY, MOBILE DEVICE HAVING THE SAME, METHOD OF SECURING MOBILE DEVICE HAVING THE SAME

(71) Applicant: Foundation of Soongsil University-Industry Cooperation, Seoul (KR)

(72) Inventors: Souhwan Jung, Seoul (KR); Ngoc-Tu Chau, Seoul (KR); Jungsoo Park, Seoul (KR)

(73) Assignee: FOUNDATION OF SOONGSIL UNIVERSITY-INDUSTRY COOPERATION, Seoul (KR)

(*) Notice: Subject to any disclaimer, the term of this patent is extended or adjusted under 35 U.S.C. 154(b) by 133 days.

(21) Appl. No.: 15/631,916

(22) Filed: Jun. 23, 2017

(65) Prior Publication Data
US 2018/0137308 A1  May 17, 2018

(30) Foreign Application Priority Data

Nov. 16, 2016 (KR) .................. 10-2016-0152410
Jan. 13, 2017 (KR) .................. 10-2017-0005820

(51) Int. Cl.
| | |
|---|---|
| *H04L 29/00* | (2006.01) |
| *G06F 21/74* | (2013.01) |
| *G06F 9/54* | (2006.01) |
| *G06F 21/62* | (2013.01) |
| *G06F 21/53* | (2013.01) |

(52) U.S. Cl.
CPC ............ *G06F 21/74* (2013.01); *G06F 9/545* (2013.01); *G06F 21/53* (2013.01); *G06F 21/6281* (2013.01)

(58) Field of Classification Search
CPC ............ G06F 3/013; G06F 3/017; G06F 2009/45579; G06F 3/0346; G06F 3/0488
See application file for complete search history.

(56) References Cited

U.S. PATENT DOCUMENTS

| | | | | |
|---|---|---|---|---|
| 2014/0137184 | A1* | 5/2014 | Russello | G06F 21/60 726/1 |
| 2014/0366025 | A1* | 12/2014 | Chinnamani | G06F 9/45545 718/1 |

FOREIGN PATENT DOCUMENTS

| | | |
|---|---|---|
| KR | 10-1216581 B1 | 12/2012 |
| KR | 10-1223981 B1 | 1/2013 |
| KR | 10-2013-0101648 A | 9/2013 |

OTHER PUBLICATIONS

Jong-Shik Lee, Kyeong-Ho Lee, "A Study on Security Container to Prevent Data Leaks". Journal of the Korea Institute of Information Security & Cryptology, vol. 24, No. 6, pp. 1225-1241. Dec. 2014.

* cited by examiner

*Primary Examiner* — Ghazal B Shehni
(74) *Attorney, Agent, or Firm* — Novick, Kim & Lee, PLLC; Sang Ho Lee

(57) ABSTRACT

A duo operating system (OS) for Android security is provided. The duo operating system includes an Android kernel providing drivers for a hardware and an interface of a mobile device, a security platform storing a security key of an integrity check when a kernel is booted in a Linux space, a first layer containing a Linux-based operating system executing a mobile device monitoring and a mobile device security examination, and a second layer containing one or more container-based Android operating systems being a user space layer interacting with users through Android applications.

14 Claims, 5 Drawing Sheets

DUO OPERATING SYSTEM FOR ANDROID SECURITY, MOBILE DEVICE HAVING THE SAME, METHOD OF SECURING MOBILE DEVICE HAVING THE SAME

CROSS-REFERENCE TO RELATED APPLICATION

This application claims priority to and the benefit of Korean Patent Application No. 10-2016-0152410, filed on Nov. 16, 2016, and Korean Patent Application No. 10-2017-0005820, filed on Jan. 13, 2017, the disclosures of which are incorporated herein by reference in their entirety.

BACKGROUND

The present disclosure relates to a technology for running an operating system (OS) on one or more other OSs using an OS-level virtualization technology as an architecture for a mobile device, and more particularly, to a duo operating system (OS) for Android security, a mobile device having a duo operating system for Android security, and a method of securing a mobile device equipped with a duo operating system.

An existing mobile device provides only one layer in which an OS operates, and a monitoring and security application operates with normal and malicious applications in the layer, that is, in the same space, regardless of a mobile security state (rooting or unrooting and jailbreaking or non-jailbreaking).

For this reason, security activists agitate for a security application, but theoretically, a security application does not have any merit in comparison with other applications.

In spite of the development of a Linux kernel, Android which is a mobile OS still cannot reuse general applications and tools of the Linux OS. Also, in some recent cases, one device has required multi-platforms.

Android emulators, such as Android virtual device (AVD) and other quick emulator (QEMU)-based emulators, are generally used for malicious code analysis. However, most Android malicious code employs anti-emulator techniques for detecting an Android emulator, and it is difficult to analyze malicious code to which an Android emulator bypassing technique has been applied.

Ubuntu Touch, Condroid, and Cells are solutions that support Android containers for different purposes.

Condroid and Cells use OS-level virtualization methods to provide one or more Android environments that may be used for different uses. Ubuntu Touch is a solution for the purpose of providing an Ubuntu-like application to Android with the help of a Linux containers (LXC) container and libhybris.

Cells and Condroid use an LXC technology for Android to build an Android container. However, LXC for Android is a sub-project of LXC and is not a main interest. Therefore, LXC for Android source code have a problem of compatibility.

For example, in some Android LXC versions, the existence of a systemd service is checked, and an error occurs when there is no systemd service. Also, projects of an Android environment developed in LXC have a limitation in that they cannot execute many applications provided in a Linux environment. Further, Ubuntu Touch only focuses on resolving a graphical user interface (GUI) problem by providing a partial container solution that is not completely isolated.

SUMMARY OF THE DISCLOSURE

According to one embodiment of the present disclosure, a duo operating system (OS) for Android security is provided. The duo operating system includes an Android kernel providing drivers for a hardware and an interface of a mobile device, a security platform storing a security key of an integrity check when a kernel is booted in a Linux space, a first layer containing a Linux-based operating system executing a mobile device monitoring and a mobile device security examination, and a second layer containing one or more container-based Android operating systems being a user space layer interacting with users through Android applications.

The first layer includes Android-space tools used for deployment, management, security, monitoring, and other expansions. The second layer includes an Android application.

A mobile device management (MDM) module is installed on the first layer to control a behavior of the second layer.

A malware analysis module is installed on the first layer to analyze an Android package kit (APK) file and a so library executed in the second layer. A multi-OS single-platform is installed on the first layer.

According to another embodiment of the present disclosure, a mobile device having a duo operating system for Android security is provided. The duo operating system includes an Android kernel providing drivers for a hardware and an interface of a mobile device, a security platform storing a security key of an integrity check when a kernel is booted in a Linux space, a first layer containing a Linux-based operating system executing a mobile device monitoring and a mobile device security examination, and a second layer containing one or more container-based Android operating systems being a user space layer interacting with users through Android applications.

According to the other embodiment of the present disclosure, a method of securing a mobile device equipped with a duo operating system (OS) including a first layer containing a Linux-based operating system executing a mobile device monitoring and a mobile device security examination, and a second layer containing one or more container-based Android operating systems being a user space layer interacting with users through an Android application is provided. The method includes verifying, by an Android kernel, an integrity of an Android container through a security platform in which a security key is stored when a kernel is booted in a Linux space, executing the Android application installed in the second layer, and detecting a malicious behavior on the Android application in the second layer through a monitoring and security application installed in the first layer.

The method further includes continuously operating, by an administrator program installed in the first layer, to analyze an Android package kit (APK) file and a so library executed in the second layer.

The method further includes, when the Android-space tools and the mobile device monitoring and security application are downloaded to the mobile device, installing the Android-space tools and the mobile device monitoring and security application on the first layer, wherein the Android-space tools are used for deployment, management, security, and monitoring.

The method further includes installing a new Android application on the second layer when the new Android application is downloaded to the mobile device.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
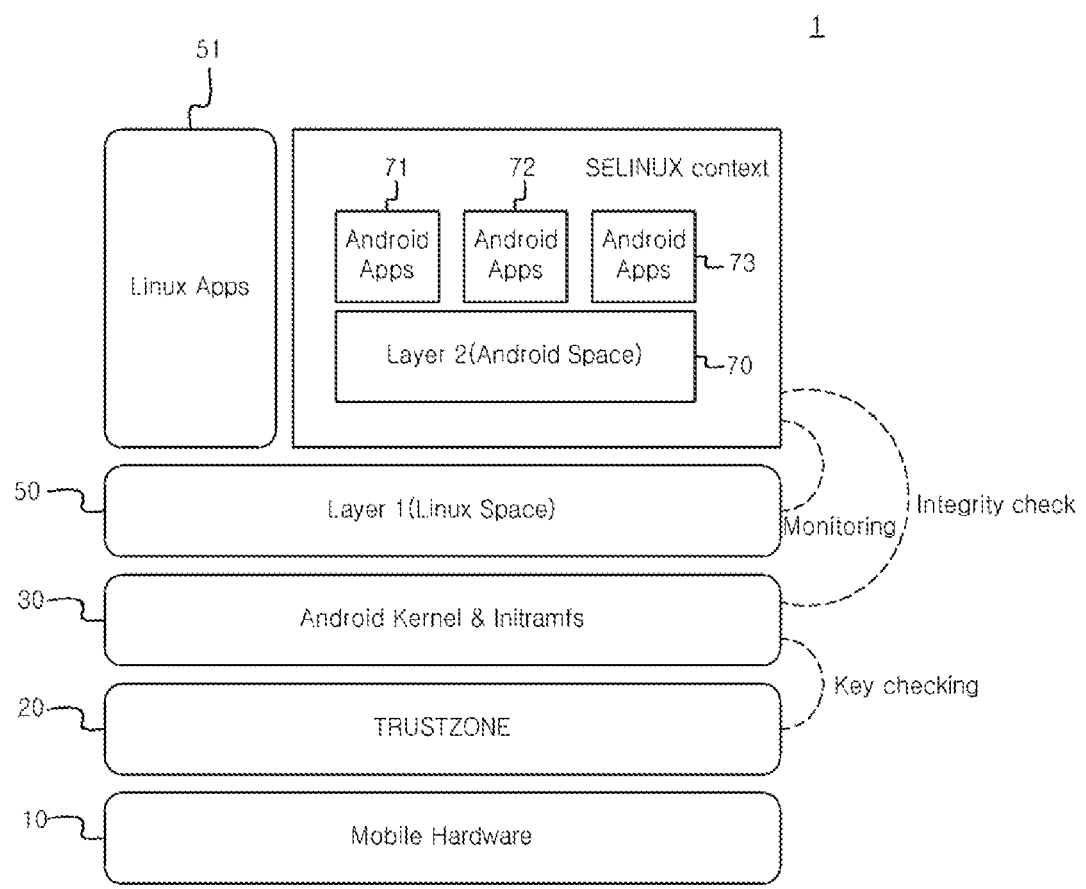
FIG. 1 is a conceptual diagram of a duo operating system (OS) model for Android security according to an exemplary embodiment of the present disclosure.

The following detailed description of the present disclosure refers to the accompanying drawings which show, by way of illustration, exemplary embodiments in which this disclosure may be practiced. These embodiments are described in sufficient detail to enable those of ordinary skill in the art to practice the present disclosure. Various embodiments of the present disclosure are to be understood as being different but not necessarily as being mutually exclusive. For example, where a particular shape described, the structure and properties can be made in the context of an embodiment implemented in other embodiments without departing from the spirit and scope of the disclosure. In addition, the individual components within each disclosed embodiment or position are to be understood as being an arrangement that can be changed without departing from the spirit and scope of the disclosure. Therefore, the description is not to be taken as limiting to the scope of the present disclosure, and instead the scope of the present disclosure is limited only by the appended claims along with the full range equal to those claims. In the drawings, like reference symbols denote the same or like functionality throughout various aspects.

Hereinafter, exemplary embodiments of the present disclosure will be described in detail with reference to the drawings.

FIG. 1 is a conceptual diagram of a duo operating system (OS) model for Android security according to an exemplary embodiment of the present disclosure.

A duo OS model 1 for Android security according to an exemplary embodiment of the present disclosure is an architecture for a mobile device and has a structure in which an OS is run on one or more other OSs using an OS-level virtualization technology.

The duo OS model 1 according to an exemplary embodiment of the present disclosure provides different OSs to each Android device as two layers. A first layer Layer 1 is a Linux-based system that provides an overall mobile device monitoring and security function. A second layer Layer 2 is a user space layer for interacting with users of mobile devices through Android applications using container-based Android.

The duo OS model 1 according to an exemplary embodiment of the present disclosure has the following merits. First, an application space (Android space) and a monitoring space (Linux space) are separated. Second, existing monitoring and security tools may be reused in Linux. Third, flexible OS deployment is possible using container technology.

The mobile device may be an Android device and may include various forms of mobile devices capable of wireless communication, such as a smart phone, a cellular phone, a tablet computer, a laptop computer, a netbook, a personal digital assistant (PDA), a portable multimedia player (PMP), a PlayStation portable (PSP), a moving picture experts group (MPEG) layer 3 (MP3) player, an e-book reader, a navigation device, a smart camera, an electronic dictionary, an electronic watch, a game machine, and so on.

The mobile device has mobility and may be referred to by other terms, such as a device, an apparatus, a terminal, user equipment (UE), a mobile station (MS), a wireless device, a handheld device, and so on.

The mobile device may execute various application programs on the basis of an OS. The OS is a system program for application programs to use hardware of a terminal device, and exemplary embodiments of the present disclosure may be based on the Android OS.

The application programs are programs developed to perform particular tasks using a mobile device and may not only include various applications, tools, and process and service objects but also include various multimedia content, such as a game, a video, a photograph, etc., and all player programs for playing the multimedia content, such as an image viewer, a video player, and so on.

The mobile device may display media data or provide a user interface (UI) to a user through a display section which is a display device supporting wireless communication.

The display section may include a liquid crystal display (LCD) panel, a plasma display panel (PDP), an organic light-emitting diode (OLED) display panel, and so on.

Also, a touch screen function may be included in the display section or provided to a separate touchpad device to process a user input. Alternatively, the mobile device may include an input section (not shown), such as a keypad, etc., which is formed separately from the display section to receive an input of the user.

Referring to FIG. 1, the duo OS model 1 according to an exemplary embodiment of the present disclosure includes an Android kernel 30 based on hardware 10 of the mobile device, a security platform 20, a first layer 50 which is a Linux space, and a second layer 70 which is an Android space.

The duo OS model 1 may be some modules of a terminal or may be a separate terminal. The configuration of the security platform 20, the Android kernel 30, the first layer 50, and the second layer 70 may be formed as an integrated module or one or more modules. However, conversely, the respective components may be formed as separate modules.

The Android kernel 30 is a Linux-based driver package for running Android, and provides drivers for interfacing with the hardware 10 of the mobile device.

A kernel area of an OS is the area that manages and controls fundamental functions of a device, such as interrupt processing, process management, memory management, file system management, provision of a programming interface, and so on. A kernel area is usually loaded onto an inaccessible memory and may be considered as an application program interface (API) for controlling the hardware.

The security platform 20 (e.g., TrustZone) may be used to store a security key for the hardware 10 of the mobile device having a reliable execution environment. The security key may be used for integrity check before kernel booting in the first layer 50 which is a Linux space.

The first layer 50 is a Linux space and a Linux-based system that provides monitoring and security functions of the overall mobile device. Android-space tools 51 used for deployment, management, security, monitoring, and other expansions are disposed in the Linux space.

The second layer 70 is an Android space and a user space layer for interacting with mobile users through Android applications using container-based Android. Android applications 71, 72, and 73 are disposed in the Android space.

Container technology is a packaging technology for bundling up an application and elements required to execute the application on the basis of OS virtualization. Since it is possible to run several containers or move a container to another operating environment and run the container, an application may be easily run and extended.

Another reason for the rapid emergence of container technology is that it helps the so-called "DevOps" that bridge the gap between development and operations. In many cases, a problem occurs in a process of transferring and deploying a system created by a developer to operating environments, and a startup time of the system is delayed. Using a container, it is possible to implant a packaged application in an operating environment as is and execute the application.

Accordingly, a developer may further concentrate on development, and an administrator may easily deploy and manage a system. An information technology (IT) architect may scale infrastructure flexibly as necessary while reducing errors during testing and deployment of a system.

Container technology is very advantageous in terms of the degree of integration, deployment rate, and performance. A container has a degree of integration which is about ten times that of a virtual machine (VM). In the related art, while ten VMs are installed in one server, 100 or more containers may be managed by one server. This is because there is neither a hypervisor layer nor a VM OS layer and fewer physical resources are used.

It is generally known that the hypervisor layer and the VM OS layer use about 10 to about 20% of entire resources in a virtual environment. In a physical server, it generally takes about 27 hours to build an operating environment. In a VM, it takes about 12 minutes to use the template function. On the other hand, it takes only about ten seconds to create a new container instance.

Also, container technology makes it possible to build a new environment faster than virtualization technology and may further reduce time required to build a new environment. Moreover, while a VM requires a manual task of loading data and causing a system to operate in conjunction with another system after building an environment, using a container makes it possible to omit such a task by inputting the task into a container image and thus is efficient.

Container technology has many advantages in terms of performance. Container technology involves a structure obtained by installing a host OS on hardware and stacking a container which is a package of an application and a library on the host OS.

In an existing bare-metal environment, when a problem occurs in a secure socket layer (SSL) library, problems immediately occur in all applications related to the SSL library. This is because of a structure in which a single library is shared. On the other hand, according to container technology, internal libraries are used according to containers. Therefore, even when a failure occurs in one container, other services are not affected.

Figure 2:
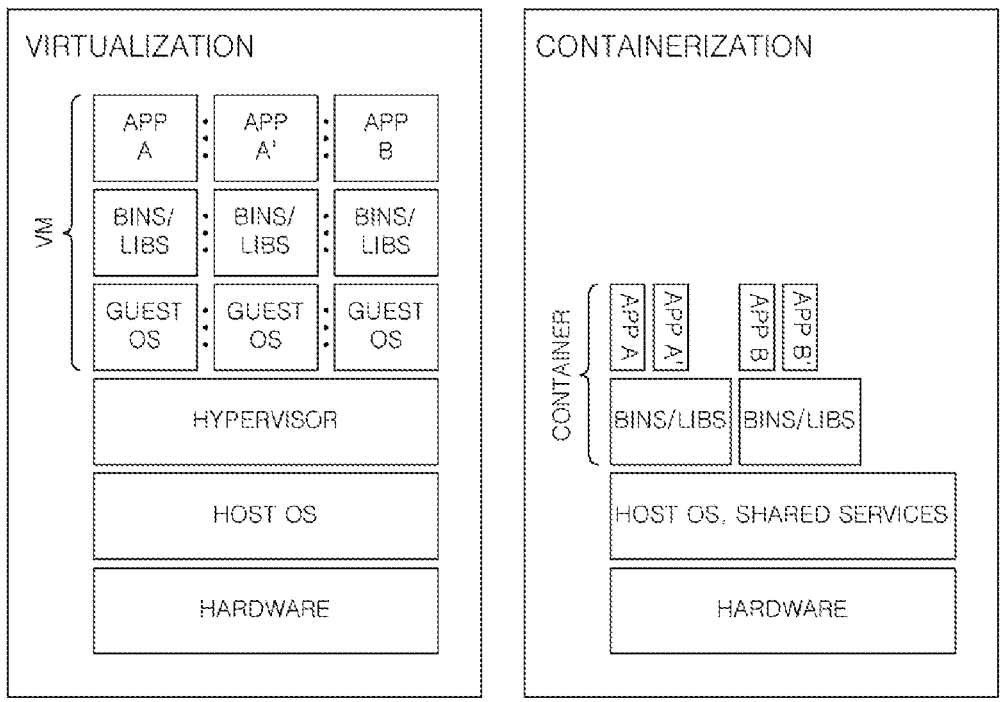
FIG. 2 is a diagram illustrating container technology used in the present disclosure and virtualization technology in comparison with each other.

When comparing container technology with virtualization technology, the biggest advantage of container technology is scalability which is applicable where real-time quickness and response are needed. Referring to FIG. 2, virtualization generally extends in a "scale-up" fashion by additionally allocating resources to a VM short of resources. On the other hand, containers are managed in a "scale-out" fashion by additionally generating and running a container which plays the same role as an existing container.

In the scale-out fashion, it is possible to cope with a failure or a service expansion more flexibly. A container is so light and flexible that generating and running a new container is faster than recovering an existing container when a failure occurs.

Meanwhile, Ubuntu Touch, Condroid, and Cells are solutions that support Android containers for different purposes.

Condroid and Cells use OS-level virtualization methods to provide one or more Android environments that may be used for different uses. Ubuntu Touch is a solution for the purpose of providing an Ubuntu-like application to Android with the help of Linux containers (LCX) and libhybris.

In Ubuntu Touch, Android SurfaceFlinger and some services are run in a Linux space so that Ubuntu applications are displayed and executed in Android display hardware. Ubuntu Touch and the duo OS model 1 according to an exemplary embodiment of the present disclosure look similar, but there is a distinct difference.

While Ubuntu Touch partially provides a container to run SurfaceFlinger in a Linux space, the duo OS model 1 according to an exemplary embodiment of the present disclosure provides a whole Linux containers (LXC) container for Android.

While Ubuntu Touch focuses on building an Ubuntu eco-system on Android device, the duo OS model 1 according to exemplary embodiments of the present disclosure focuses on improving stability and flexibility of an Android phone.

Since the duo OS model 1 according to exemplary embodiments of the present disclosure focuses on creating a secure Android space, it is possible to reject a root file system which has not passed through integrity check with the help of the security platform 20 (e.g., TrustZone) for verifying integrity of container root file systems. Accordingly, malicious program detection may be performed more solidly.

The duo OS model 1 according to exemplary embodiments of the present disclosure provides a new concept of OS for a mobile device and has the following characteristics.

First, an existing mobile device provides only one layer where an OS operates, and a monitoring and security applications in the layer operate in the same space as normal and malicious applications regardless of the mobile security state (rooted or unrooted and jailbroken or non-jailbroken).

On the other hand, in the duo OS model 1 according to an exemplary embodiment of the present disclosure, the monitoring and security applications are installed in the Linux space 50, and the Android application is installed in the Android space 70, so that the monitoring and security applications and the Android application are separated from each other.

In spite of the development of the Linux kernel, Android which is a mobile OS is not yet capable of reusing general applications and tools of the Linux OS. However, in the duo OS model 1 according to an exemplary embodiment of the present disclosure, existing monitoring and security tools can be reused in Linux.

Also, in some recent cases, one device requires multi-platforms. Since the duo OS model 1 according to an exemplary embodiment of the present disclosure uses container technology, it is possible to deploy a Linux system as well as an Android system without generating a plurality of partitions. Accordingly, a flexible OS may be deployed.

Android emulators, such as Android virtual device (AVD) and other quick emulator (QEMU)-based emulators, are generally used for malicious code analysis. However, most Android malicious code employs anti-emulator techniques for detecting an Android emulator. In general, anti-emulator techniques are intended to distinguish between actual mobile hardware and hardware information of an emulator.

On the other hand, since the duo OS model 1 according to exemplary embodiments of the present disclosure uses container technology in which actual hardware information of a mobile device is extracted, it is not possible to distinguish between the duo OS model 1 according to exemplary embodiments of the present disclosure and an actual mobile device.

The duo OS model 1 according to exemplary embodiments of the present disclosure may use the following solutions:

Mobile device management (MDM)
Malicious analysis
Multiple OSs on a single platform First, MDM will be described. In comparison with existing Cells and Condroid, the duo OS model 1 according to an exemplary embodiment of the present disclosure provides a Linux space management function which facilitates development of a security and monitoring application.

Also, while Ubuntu Touch focuses on experience of a user, the duo OS model 1 according to an exemplary embodiment of the present disclosure focuses on security of a user application program. The duo OS model 1 according to an exemplary embodiment of the present disclosure provides a whole container solution which has no sharing service.

In relation to malware analysis, existing QEMU-based virtualization involves distinguishing between actual mobile hardware and hardware information of an emulator. On the other hand, the duo OS model 1 according to an exemplary embodiment of the present disclosure provides actual hardware information which is not distinguished from actual device. Also, container technology shows much faster speed than virtualization technology.

In a real mobile device, the duo OS model 1 according to an exemplary embodiment of the present disclosure provides a useful cloud-integrated solution and an easy-to-develop solution compared to an actual device.

Exemplary embodiments of the above-described three solutions in a mobile device will be described in detail below with reference to drawings.

Figure 3:
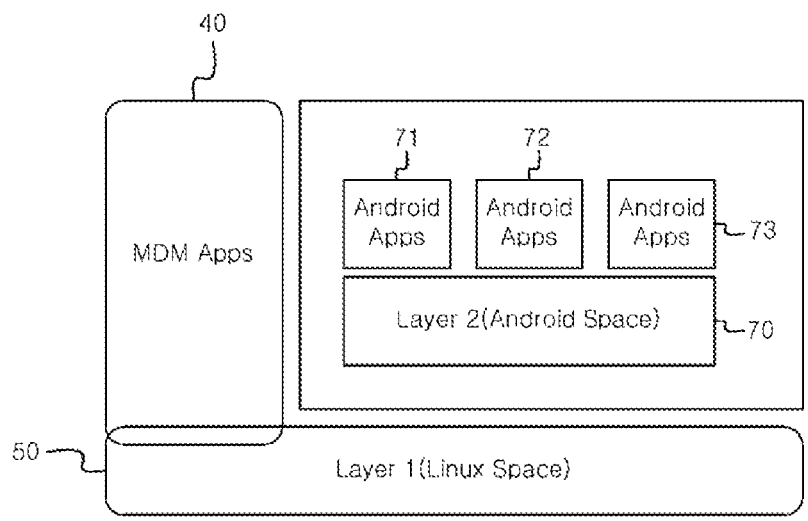
FIG. 3 is a block diagram of a mobile device management (MDM) solution according to an exemplary embodiment of the present disclosure.

FIG. 3 is a block diagram of an MDM solution according to an exemplary embodiment of the present disclosure.

Referring to FIG. 3, in the duo OS model 1 according to an exemplary embodiment of the present disclosure, an MDM application 40 may be deployed on the Linux space 50 to control behavior of the Android space 70. After the Android space 70 is disposed by LXC, all information of containers may be examined through /proc/$container_id/ or an LXC-execute command.

Some of Android malicious applications try to avoid detection in a root environment. An exemplary embodiment of the present disclosure provides the Android space 70 which has not been rooted, so that detection may be performed in the Linux space 50 through the MDM application 40 while a malicious application is executed in the Android space 70.

Accordingly, according to an exemplary embodiment of the present disclosure, it is possible to check a root state of the Android space 70 and prevent a malicious application from avoiding detection. Also, an exemplary embodiment of the present disclosure provides an advantage in that malicious behavior occurring in the Android space 70 may be checked in the Linux space 50 and integrity of an Android container may be verified through the ARM TrustZone 20.

Figure 4:
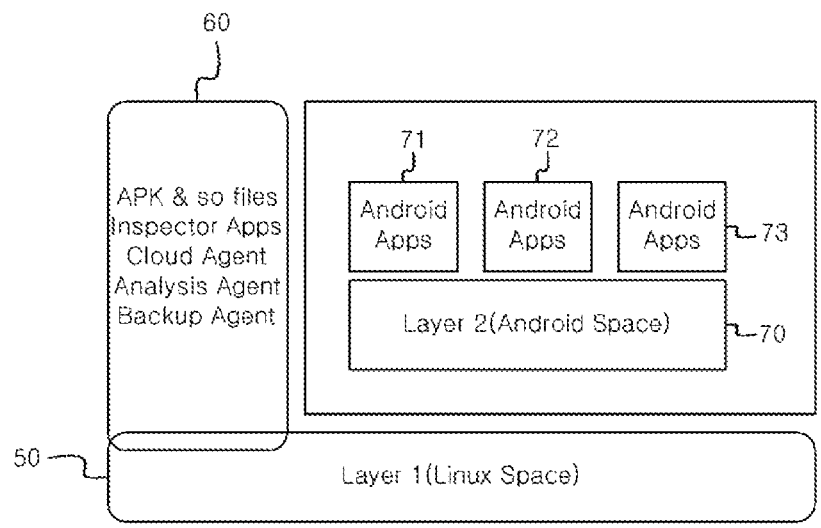
FIG. 4 is a block diagram of a malware analysis solution according to another exemplary embodiment of the present disclosure.

FIG. 4 is a block diagram of a malware analysis solution according to another exemplary embodiment of the present disclosure.

Referring to FIG. 4, in the duo OS model 1 according to an exemplary embodiment of the present disclosure, an application 60 for malicious code analysis may be disposed on the Linux space 50 to analyze an Android package kit (APK) file and a .so library executed in the Android space 70.

Accordingly, an application for malicious code analysis may be installed in the first layer and may detect an Android-based malicious application installed in the second layer which is an Android space. For example, it is possible to prevent a malicious code which may be present on an OS of an Android terminal from accessing an application requiring security (e.g., an application for detecting a malicious app).

Since Android containers have been developed using container technology, it is very easy for an administrator program to prevent a system call and kernel-related behavior malicious to the Android space 70 while continuously operating in the Linux space 50. Also, it is possible to easily back up a container using container technology.

Therefore, an exemplary embodiment of the present disclosure may help to recover a mobile system from a fatal attack to an Android space. Since Android containers are able to directly access a processing system and actual hardware, an exemplary embodiment of the present disclosure shows higher disposition speed than QEMU, and it is not possible to distinguish between an Android container and an actual device through comparison therebetween.

Figure 5:
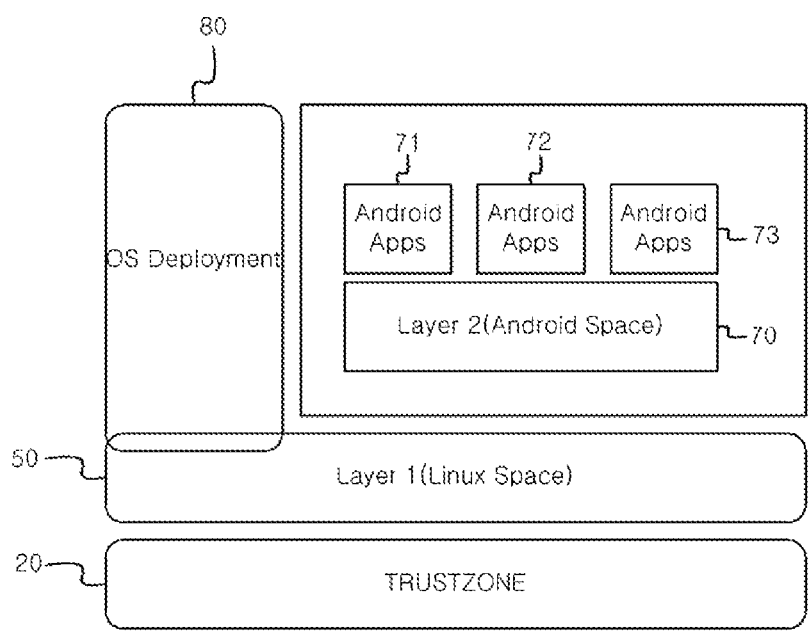
FIG. 5 is a block diagram of a multi-OS single-platform solution according to another exemplary embodiment of the present disclosure.

FIG. 5 is a block diagram of a multi-OS single-platform solution according to another exemplary embodiment of the present disclosure.

Referring to FIG. 5, an OS deployment module 80 may be disposed at the top of the Linux space 50. Accordingly, the ARM TrustZone 20 and the OS deployment module 80 (Linux space) are used to further facilitate integrity check of a single platform and deployment of a Linux or Android version in the single platform.

According to an exemplary embodiment of the present disclosure, different OSs are provided to two layers using an Android OS-level virtualization technology. Accordingly, a monitoring and security application is installed in a Linux space, and an Android application is separately installed in an Android space, so that a non-rooted Android space is provided. In this way, while a malicious application is executed in the Android space, detection may be performed in the Linux space.

This provides higher speed than virtualization technology and provides a Linux space management function which facilitates development of a security and monitoring application.

Further, since container technology is used, it is possible to deploy a Linux system as well as an Android system without generating a plurality of partitions, and stability and flexibility are high in an Android device.

Figure 6:
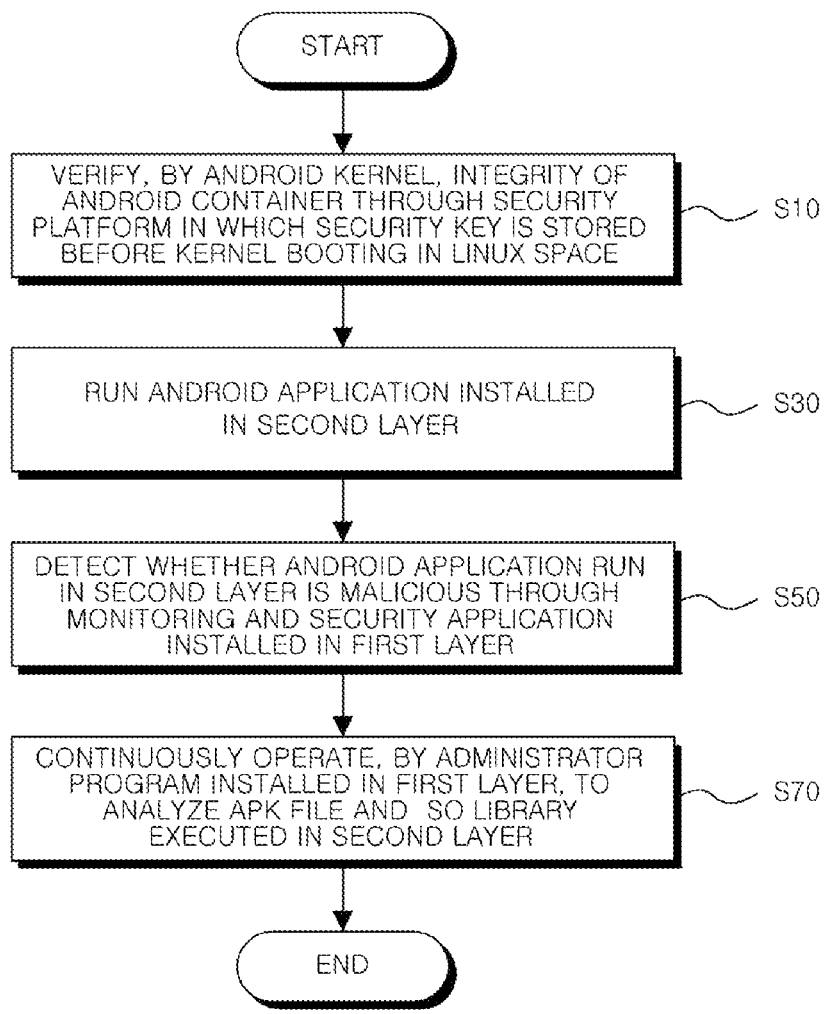
FIG. 6 is a flowchart of a method of securing a mobile device equipped with a duo OS model according to an exemplary embodiment of the present disclosure.
Figure 7:
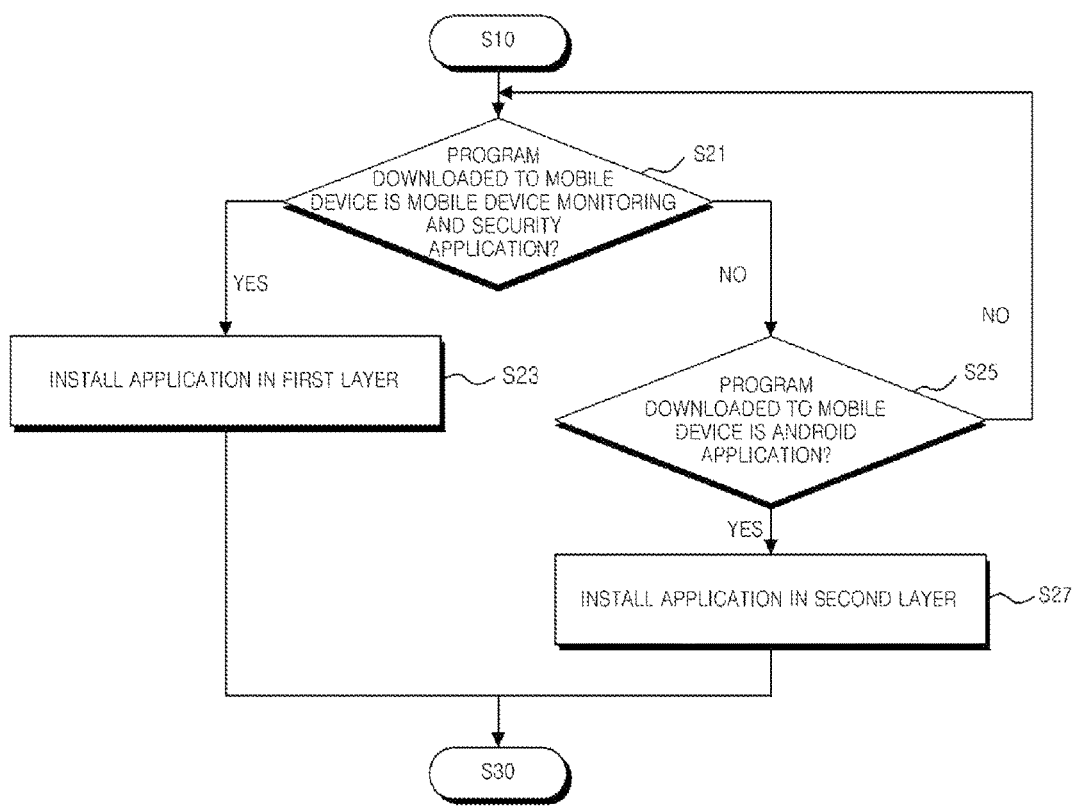
FIG. 7 is a detailed flowchart of the method of securing a mobile device equipped with a duo OS model illustrated in FIG. 6.

FIG. 6 is a flowchart of a method of securing a mobile device equipped with a duo OS model according to an exemplary embodiment of the present disclosure. FIG. 7 is a detailed flowchart of the method of securing a mobile device equipped with a duo OS model illustrated in FIG. 6.

The method of securing a mobile device equipped with a duo OS model according to the present embodiment may proceed in substantially the same configuration as that of the duo OS model 1 for Android security shown in FIG. 1. Therefore, the same components as those of the duo OS model 1 of FIG. 1 will be given the same reference numerals, and duplicate descriptions will be omitted.

The method of securing a mobile device according to the present embodiment is performed through the duo OS model 1 which provides different OSs to each Android device as two layers. Specifically, the method is performed by a mobile device equipped with the duo OS model 1 including the first layer 50 which is a Linux-based OS providing a mobile device monitoring and security function and the second layer 70 which is a user space layer interacting with mobile users through Android applications and is a container-based Android OS.

In exemplary embodiments of the present disclosure, the first layer 50 is a Linux space and a Linux-based system that provides an overall mobile device monitoring and security function. The Android-space tools 51 used for deployment, management, security, monitoring, and other expansions are disposed in the Linux space.

On the other hand, the second layer 70 is an Android space and a user space layer for interacting with mobile users through Android applications using container-based Android. The Android applications 71, 72, and 73 are disposed in the Android space.

Referring to FIG. 6, the method of securing a mobile device equipped with a duo OS model according to the present embodiment involves verifying, by an Android kernel, integrity of an Android container through a security platform 20 in which a security key is stored before kernel booting in the Linux space 50 (S10).

For the hardware 10 of the mobile device having a reliable execution environment, the security key may be stored in the security platform 20 (e.g., TrustZone) and used for integrity check before kernel booting in the first layer 50 which is the Linux space.

Referring to FIG. 7, when a program is downloaded to the mobile device, it is determined whether the downloaded program is a mobile device monitoring and security application (operation S21).

In this case, the mobile device monitoring and securing application includes an Android-space tool used for deployment, management, security, monitoring, and other expansions.

When the downloaded program is a mobile device monitoring and securing application, the application is installed in the first layer 50 of the duo OS model 1 (operation S23).

On the other hand, when an Android application is downloaded to the mobile device (operation S25), the Android application is installed in the second layer 70 of the duo OS model 1 (operation S27).

Accordingly, an Android application installed in the second layer 70 is run (operation S30), and simultaneously, it may be detected whether the Android application run in the second layer 70 is malicious through a monitoring and security application installed in the first layer 50 (operation S50).

Since the duo OS model 1 according to exemplary embodiments of the present disclosure focuses on creating a secure Android space, it is possible to reject a root file system which has not passed through integrity check with the help of the security platform 20 (e.g., TrustZone) for verifying integrity of container root file systems.

In the duo OS model 1 according to an exemplary embodiment of the present disclosure, at least one of the MDM solution, the malicious analysis solution, and the multi-OS single-platform solution may be used to control behavior of the Android space 70 and may be deployed on the Linux space 50.

First, MDM will be described. In comparison with existing Cells and Condroid, the duo OS model 1 according to an exemplary embodiment of the present disclosure provides a Linux space management function which facilitates development of a security and monitoring application.

Some of Android malicious applications try to avoid detection in a root environment. An exemplary embodiment of the present disclosure provides the Android space 70 which has not been rooted, so that detection may be performed in the Linux space 50 through the MDM application 40 while a malicious application is executed in the Android space 70.

Accordingly, according to an exemplary embodiment of the present disclosure, it is possible to check a root state of the Android space 70 and prevent a malicious application from avoiding detection. Also, an exemplary embodiment of the present disclosure provides an advantage in that malicious behavior occurring in the Android space 70 may be checked in the Linux space 50 and integrity of an Android container may be verified through the ARM TrustZone 20.

Also, while Ubuntu Touch focuses on experience of a user, the duo OS model 1 according to an exemplary embodiment of the present disclosure focuses on security of a user application program. The duo OS model 1 according to an exemplary embodiment of the present disclosure provides a whole container solution which has no sharing service.

In relation to malware analysis, existing QEMU-based virtualization involves distinguishing between actual mobile hardware and hardware information of an emulator. On the other hand, the duo OS model 1 according to an exemplary embodiment of the present disclosure provides actual hardware information which is not distinguished from actual device. Also, container technology shows much faster speed than virtualization technology.

In the duo OS model 1 according to an exemplary embodiment of the present disclosure, an application 60 for malicious code analysis may be disposed on the Linux space 50 and continuously operate to analyze an APK file or a so library executed in the Android space 70 (operation S70).

Accordingly, it is possible to prevent a malicious code which may be present on an OS of an Android terminal from accessing an application requiring security (e.g., an application for detecting a malicious app).

Since the present disclosure has developed Android containers using container technology, it is very easy for an administrator program to prevent a system call and kernel-related behavior malicious to the Android space 70 while continuously operating in the Linux space 50. Also, it is possible to easily back up a container using container technology.

Therefore, an exemplary embodiment of the present disclosure may help to recover a mobile system from a fatal attack to an Android space. Since Android containers are able to directly access a processing system and actual hardware, an exemplary embodiment of the present disclosure shows higher disposition speed than QEMU, and it is not possible to distinguish between an Android container and an actual device through comparison therebetween.

Also, in a real mobile device, the duo OS model 1 according to an exemplary embodiment of the present disclosure provides a useful cloud-integrated solution and a solution which is easily developed compared to an actual device.

Further, the multi-OS single-platform solution is disposed on the Linux space 50, and the ARM TrustZone 20 and the OS deployment module 80 (the Linux space) are used to further facilitate integrity check of a single platform and deployment of a Linux or Android version in the single platform.

In the duo OS model 1 according to an exemplary embodiment of the present disclosure, an application space (Android space) and a monitoring space (Linux space) are separated, so that a non-rooted Android space is provided. In this way, while a malicious application is executed in the Android space, detection may be performed in the Linux space.

Also, existing monitoring and security tools may be reused in Linux, and flexible OS deployment is possible using container technology.

The above-described method of securing a mobile device equipped with a duo OS model may be embodied in the form of an application or program instructions executable by various computer components and recorded in a computer-readable recording medium. The computer-readable recording medium may include program instructions, data files, data structures, or the like solely or in combination.

The program instructions recorded in the computer-readable recording medium may be specially designed or configured for the present disclosure or may be known to and used by those of ordinary skill in the computer software art.

Examples of the computer-readable recording medium include magnetic media such as a hard disk, a floppy disk, and a magnetic tape, optical recording media such as a compact disc read-only memory (CD-ROM) and a digital versatile disc (DVD), magneto-optical media such as a floptical disk, and hardware devices such as a ROM, a random access memory (RAM), a flash memory, etc. specially configured to store and execute the program instructions.

Examples of the program instructions include a high-level language code executable by a computer using an interpreter or the like as well as a machine language code created by a compiler. The hardware devices may be configured to operate as one or more software modules to perform processing according to the present disclosure, and vice versa.

According to the above-described duo OS model for Android security, different OSs are provided to two layers using an Android OS-level virtualization technology. Specifically, a monitoring and security application is installed in a Linux space, and an Android application is separately installed in an Android space, so that a non-rooted Android space is provided. Therefore, while a malicious application is executed in the Android space, it is possible to check a state change caused by the malicious application in the Linux space.

This provides higher speed than virtualization technology and provides a Linux space management function which facilitates development of a security and monitoring application.

Further, since container technology is used, it is possible to deploy a Linux system as well as an Android system without generating a plurality of partitions, and stability and flexibility are high in an Android device.

Since the present disclosure provides different OSs to two layers using an Android OS-level virtualization technology, it is possible to deploy a Linux system as well as an Android system without generating a plurality of partitions, and stability and flexibility are high in an Android device. Therefore, the present disclosure is expected to be usefully applied to analyses of Android malicious code.

Although the present disclosure has been described above with reference to exemplary embodiments, it should be apparent to those of ordinary skill in the art that various modifications and alterations can be made to the above-described exemplary embodiments of the present disclosure without departing from the spirit or scope of the disclosure.

What is claimed is:

1. A duo operating system (OS) for Android security, the duo operating system comprising:
   an Android kernel providing drivers for interfacing with a hardware of a mobile device;
   a security platform storing a security key for an integrity check when a kernel is booted in a Linux space;
   a first layer creating the Linux space and containing a Linux-based operating system executing a monitoring and a security examination of the mobile device; and
   a second layer creating an Android space and containing one or more container-based Android operating systems to create a user space layer interacting with users through Android applications,
   wherein monitoring and security applications are installed in the Linux space and the Android applications are installed in the Android space, and the monitoring and security applications and the Android applications are operated separately from each other,
   wherein, when the Android applications installed in the Android space are run, the Linux-based operating system in the first layer simultaneously detects whether the Android applications run in the second layer are malicious through the monitoring and security applications installed in the Linux space.

2. The duo operating system of claim 1, wherein the first layer includes Android-space tools used for deployment, management, security, monitoring, and other expansions.

3. The duo operating system of claim 1, wherein a mobile device management (MDM) module is installed on the first layer to control a behavior of the second layer.

4. The duo operating system of claim 1, wherein a malware analysis module is installed on the first layer to analyze an Android package kit (APK) file and a .so library executed in the second layer.

5. The duo operating system of claim 1, wherein a multi-OS single-platform is installed on the first layer.

6. A mobile device having a duo operating system for Android security, the duo operating system comprising:
   an Android kernel providing drivers for interfacing with a hardware of a mobile device;

a security platform storing a security key for an integrity check when a kernel is booted in a Linux space;

a first layer creating the Linux space and containing a Linux-based operating system executing a monitoring and a security examination of the mobile device; and a second layer creating an Android space and containing one or more container-based Android operating systems to create a user space layer interacting with users through Android applications, wherein monitoring and security applications are installed in the Linux space and the Android applications are installed in the Android space, and the monitoring and security applications and the Android applications are operated separately from each other, wherein, when the Android applications installed in the Android space are run, the Linux-based operating system in the first layer simultaneously detects whether the Android applications run in the second layer are malicious through the monitoring and security applications installed in the Linux space.

7. The mobile device of claim 6, wherein the first layer includes Android-space tools used for deployment, management, security, monitoring, and other expansions.

8. The mobile device of claim 6, wherein a mobile device management (MDM) module is installed on the first layer to control a behavior of the second layer.

9. The mobile device of claim 6, wherein a malware analysis module is installed on the first layer to analyze an Android package kit (APK) file and a .so library executed in the second layer.

10. The mobile device of claim 6, wherein a multi-OS single-platform is installed on the first layer.

11. A method of securing a mobile device equipped with a duo operating system (OS) including a first layer creating a Linux space and containing a Linux-based operating system executing a monitoring and a security examination for the mobile device, and a second layer creating an Android space and containing one or more container-based Android operating systems to create a user space layer interacting with users through Android applications, the method comprising:

verifying, by an Android kernel, an integrity of an Android container through a security platform in which a security key is stored when a kernel is booted in the Linux space;

executing the Android applications installed in the second layer; and detecting a malicious behavior on the Android applications installed in the second layer through monitoring and security applications installed in the first layer, wherein the monitoring and security applications and the Android applications are operated separately from each other, wherein, when the Android applications installed in the second layer are run, the Linux-based operating system in the first layer simultaneously detects whether the Android applications run in the second layer are malicious through the monitoring and security applications installed in the first layer.

12. The method of claim 11, further comprising continuously operating, by an administrator program installed in the first layer, to analyze an Android package kit (APK) file and a .so library executed in the second layer.

13. The method of claim 11, further comprising, when the Android-space tools and the mobile device monitoring and security application are downloaded to the mobile device, installing the Android-space tools and the mobile device monitoring and security application on the first layer, wherein the Android-space tools are used for deployment, management, security, and monitoring.

14. The method of claim 11, further comprising installing a new Android application on the second layer when the new Android application is downloaded to the mobile device.

* * * * *